United States Patent
Wu et al.

(10) Patent No.: US 8,326,324 B2
(45) Date of Patent: Dec. 4, 2012

(54) SYSTEMS AND METHODS FOR LOCATION POSITIONING WITHIN RADIO ACCESS SYSTEMS

(75) Inventors: Shiquan Wu, Nepean (CA); Jung Yee, Ottawa (CA)

(73) Assignee: Wi-LAN, Inc., Ottawa (CA)

( * ) Notice: Subject to any disclaimer, the term of this patent is extended or adjusted under 35 U.S.C. 154(b) by 1139 days.

(21) Appl. No.: 12/007,198

(22) Filed: Jan. 8, 2008

(65) Prior Publication Data
US 2009/0176507 A1  Jul. 9, 2009

(51) Int. Cl.
*H04W 24/00* (2009.01)
*H04M 11/10* (2006.01)
*H04B 7/00* (2006.01)
*G01S 3/02* (2006.01)

(52) U.S. Cl. ............... 455/456.2; 455/456.6; 455/414.2; 455/521; 342/450

(58) Field of Classification Search ............... 455/456.2, 455/456.6, 414.2, 521; 342/450; 701/213, 701/214
See application file for complete search history.

(56) References Cited

U.S. PATENT DOCUMENTS

| | | | |
|---|---|---|---|
| 5,548,583 A | 8/1996 | Bustamante | |
| 5,945,948 A * | 8/1999 | Buford et al. | 342/457 |
| 6,249,252 B1 | 6/2001 | Dupray | |
| 6,453,168 B1 * | 9/2002 | McCrady et al. | 455/517 |
| 6,845,239 B1 | 1/2005 | Sato et al. | |
| 6,996,392 B2 | 2/2006 | Anderson et al. | |
| 7,023,383 B2 | 4/2006 | Stilp et al. | |
| 2002/0094820 A1 | 7/2002 | Keranen et al. | |
| 2004/0017311 A1 * | 1/2004 | Thomas et al. | 342/450 |
| 2004/0102196 A1 | 5/2004 | Weckstrom et al. | |
| 2005/0064877 A1 | 3/2005 | Gum et al. | |
| 2005/0192026 A1 | 9/2005 | Carlson et al. | |
| 2007/0161383 A1 | 7/2007 | Caci | |
| 2007/0270164 A1 | 11/2007 | Maier et al. | |
| 2008/0014960 A1 | 1/2008 | Chou | |
| 2008/0228437 A1 | 9/2008 | Damarla | |
| 2008/0261623 A1 * | 10/2008 | Etemad et al. | 455/456.2 |

FOREIGN PATENT DOCUMENTS

| | | |
|---|---|---|
| WO | 9819488 | 5/1998 |
| WO | 2008130816 | 10/2008 |

OTHER PUBLICATIONS

Wang, et al., "Mobile Positioning Technologies and Location Services", Nokia Research Center, IEEE RAWCON 2002, pp. 9-12 0-7803-7458-4/02.

* cited by examiner

*Primary Examiner* — Ariel Balaoing
(74) *Attorney, Agent, or Firm* — Procopio, Cory, Hargreaves & Savitch LLP (57) ABSTRACT

A method for calculating the geographical position of a user equipment (UE) unit includes collecting position parameters conveying the relative position of the UE unit from two or more base stations using technologies mandated for the modern wireless networks. Particularly, know (predetermined) signals embedded in the downlink and uplink subframes, such as preambles, pilots, ranging codes are used for determining the coordinates of the UE unit. In addition, the methods and systems proposed here take advantage of the multiple antennas systems mandated at both the UE and BTS.

15 Claims, 6 Drawing Sheets

SYSTEMS AND METHODS FOR LOCATION POSITIONING WITHIN RADIO ACCESS SYSTEMS

FIELD OF THE INVENTION

The invention is directed to mobile radio access systems and in particular to systems and methods for determining the geographical location of a caller operating a mobile (wireless) device over a mobile radio access system.

BACKGROUND

Wireless networks have significantly impacted the world in the last decades and their uses continue to grow significantly. People and businesses use wireless networks to send and share data quickly whether it be in a small office building or across the world. Emergency services such as the police department utilize wireless networks to communicate important information quickly. Another important use for wireless networks is as an inexpensive and rapid way for connection to the Internet in countries and regions where the telecom infrastructure is poor or there is a lack of resources, like in many developing countries. One of the latest such wireless technologies is WiMax (Worldwide Interoperability for Microwave Access).

A brief review of the WiMax technology follows for providing the readers with a better understanding of the invention. It is to be noted that the invention is not limited to the WiMax technology, but it is applicable to any wireless technology that uses predetermined periodic bit sequences and multiple antennas in downlink and uplink frames, such as frame preambles, pilot tones, and/or ranging codes used by WiMax.

WiMax is an emerging telecommunications technology that provides long range wireless communication, and enables both point-to-point and full mobile cellular type access. This technology is based on IEEE 802.16 standard. The initial draft standard for this technology, called 802.16d, or 802.16-2004 has never reached the standard status. Systems built using 802.16-2004 (802.16d) and OFDM PHY with 256 carriers as the air interface, are generally referred to as "fixed WiMax".

The next version of the draft, 802.16e (or 802.16-2005), which is an amendment to 802.16d, is often referred to as "mobile WiMax". This term refers to wireless systems that use 802.16e-2005 and OFDMA (orthogonal frequency-division multiple access) with 128, 512, 1024 and 2048 carriers as the air interface. In OFDMA, a spread-coded string of symbols of a signal to be transmitted is modulated on subcarriers which are preferably distributed into a broad frequency band. OFDMA assigns subsets of subcarriers to individual users, and based on feedback about the channel conditions, the system can implement adaptive user-to-subcarrier assignment.

Mobile WiMax implementations can be used to deliver both fixed and mobile services. The mobile WiMax also uses Multiple Antenna Support through Multiple-Input Multiple-Output communications (MIMO). A base transceiver station (BTS), also called a base station (BT), uses at least two receiving antennae and two transmitting antennae and the user equipment (UE unit) uses at least two receiving antennae and a transmitting antenna. This brings potential benefits in terms of coverage, spatial diversity and spatial multiplexing, interference cancellation, frequency re-use and spectrum efficiency.

Mobile WiMax has just been approved by ITU, and telecommunication companies such as Sprint-Nextel in USA and France Telecom in France have announced their intention to deploy such systems. In Canada, Rogers communications and Bell Canada started to provide WiMax based Broadband Internet service on 2.5 GHz frequency band, covering most major cities like Toronto using Motorola's DRM units.

In the meantime, the advancements in the wireless networks technologies enabled deployment of wireless location positioning systems, particularly systems designed to locate the geographical position of callers that place emergency calls (such as "911" in SUA and Canada) using a mobile device. One of the purposes of this service is to enable a wireless network to identify to which Public Safety Answering Point (PSAP) to route an emergency call and to inform the PSAP that answers the call where the caller is. A PSAP will then exploit the knowledge about where a caller is located and provide the information of his/her surroundings such as directions, nearby restaurants, museums, etc to the emergency services. Location based services have been a hot topic for B3G (beyond 3G) wireless systems such as 3GPP/UMTS/LTE (long term evolution), WiMax/IEEE 802.16e, UMB (ultra mobile broadband) etc.

Currently, the "911" service is capable of locating fixed phones in most geographical areas in the United States and Canada; other countries have similar emergency services. For wireline "911", the location is an address.

The U.S. Federal Communications Commission (FCC) rolled out a location technology called E911 (Enhanced 911), which enables cellular/mobile devices to process 911 emergency calls for timely deployment of assistance. For Wireless E911, the location is a coordinate. The FCC has rolled out E911 in two phases. In 1998, Phase I required that mobile phone carriers identify the originating caller phone number and the location of the signal tower, or cell, with an accuracy of less than one mile. In 2001, Phase II required that each mobile phone company doing business in the United States must offer either handset or network-based location detection capability so that the caller's geographic location, termed ALI (Automatic Location Identification) be provided with an accuracy of less than 100 meters.

Several methods are known for determining the location of a mobile caller (MC) as required by Phase I. These are called "network based" methods since they employ a wide area array of antennas and transceivers coupled together, and a mobile caller can be located whenever contained within the area that is covered by the respective transceivers/antennae. Such methods usually require minimal modifications in the mobile devices involved in ALI. However, the current network based methods are not very accurate and may not work particularly well in an indoor environment.

Foe example, it is known to measure the Angle of Arrival (AOA) of a signal received at two (or more) base station antennae; trigonometric calculations then establish the caller's coordinates using the known location of the antennae and the AOA of the received signal.

It is also known to identify the location of a MC by measuring the Time of Arrival (TOA) of a signal emitted by the caller's mobile at three (or more) network antennae. The location of the MC can be then determined knowing the location of these antennae, the three TOA's measurements, and the velocity of the signal (the velocity of electromagnetic waves/light). This is accomplished by determining the geometric locus of the points at a fixed, known distance (range) from a fixed point (the location of the MC); the range is determined from the TOA. As this method gives two points, a fourth antenna is used sometimes to remove this ambiguity or to compensate for clock discrepancies.

Other network based solutions provide the location of the mobile by measuring at a base station the round-trip delay of a signal sent from the base station to mobile and back, or in other words, the time elapsed between transmission of a signal from the base station and reception of the response from the mobile. This round trip delay is then used to evaluate the distance between the two; the distance and the AOA measurement at the base station are used to estimate the coordinates of the mobile.

However, the AOA, TOA and round trip delay methods are based on line of sight distance measurements (straight distance between the UE unit and the antennae), which can be difficult or impossible to determine in mountainous terrain or in the cities around high buildings and other obstacles. Therefore, the results obtained with these methods are inaccurate. In addition, the location of the caller is not very accurate, especially in the case of indoor calls.

Currently, Phase II of the E911 technology is mainly implemented using Global Positioning System (GPS) embedded into the caller's equipment. The GPS units are embedded in the mobile devices and normally determine their position by computing relative times of arrival of signals transmitted simultaneously from a multiplicity of GPS satellites (i.e. GPS/NAVSTAR). These satellites transmit both satellite positioning data and GPS-assist data, such as clock timing or "ephemeris" data. If the roaming device is known to be essentially on the ground (e.g., mounted in a car), the earth globe, with proper topography, can be used as an additional reference "sphere" to refine the TOA calculations.

However, the process of searching for and acquiring GPS signals, reading the ephemeris data for a multiplicity of satellites and computing the location of the receiver from this data is time consuming, often requiring several minutes. In many cases, this lengthy processing time is unacceptable, particularly in emergency situations where location is being determined for a 911 dispatch centre. In addition, in order to use GPS, the mobile device must be GPS-enabled, which is not always the case. Equipping the mobiles with GPS units also increases the cost, which may become prohibitive for many. Still further, a GSP receiver does not operate properly in some types of environment such as indoors or where satellite signals get blocked.

All the methods described above have not yet provided satisfactory solutions to the problem of wirelessly determining the location of callers using small, inexpensive and low power roaming devices. Also, current methods and systems do not operate well over a wide area, without requiring a dedicated infrastructure.

Therefore, a need to improve location determination still exists, both with a view to enhance the services offered to mobile device users and particularly in with of the E911 regulations by the FCC in the US.

SUMMARY OF THE INVENTION

It is an object of the invention to provide methods and systems for determining the location of a mobile caller in compliance with FCC requirements.

Another object of the invention is to provide methods and systems for determining the location of a mobile caller that are inexpensive and applicable over a wide area, without requiring a dedicated infrastructure.

Accordingly, the invention provides method for determining the location of a user equipment (UE) unit operating within the coverage area of a two or more base transceiver stations (BTS) that transmit a specified periodic bit sequence over a radio access network, comprising: a) at the UE unit, monitoring incoming traffic received from the BTSs for detecting the specified periodic bit sequence; b) determining from the specified periodic bit sequences at least two position parameters that convey the relative position of the UE unit to two or more of the BTSs; and c) processing the position parameters for establishing the geographical coordinates of the UE unit.

The invention also provides a location identification module for a user equipment (UE) unit equipped with a first and a second antenna, comprising: a monitoring unit for monitoring the incoming traffic and identifying a specified periodic bit sequence received from at least two neighbouring base transceiver stations (BTSs); a position parameters calculation arrangement for determining from the specified periodic bit sequences two position parameters conveying the relative position of the UE unit from the respective BTSs; and a coordinate estimator for processing the two position parameters and establishing the geographical coordinates of the UE unit.

According to another aspect of the invention, there is provided a method for determining the location of a user equipment (UE) unit operating within the coverage area of a plurality of antennae of a base transceiver station (BTS) in a radio access network, the UE unit transmitting uplink a specified periodic bit sequence. The method comprises i) at the BTS, monitoring the incoming traffic received from the UE unit over two receive antennae for detecting the specified periodic bit sequence; ii) measuring a respective first and second position parameter from the specified periodic bit sequence received as the first and second antenna, respectively; and iii) processing the first and second position parameters at the BTS for establishing the geographical coordinates of the UE unit.

Still further, the invention provides a location identification module for a base transceiver station (BTS) operating in a radio access network, the BTS having a first and a second antennae, comprising: a first monitoring unit for monitoring the incoming traffic received on the first antenna and identifying the specified periodic bit sequence received from a user equipment (UE) unit positioned in the area of coverage of the BTS and determining a first position parameter; a second monitoring unit for monitoring the incoming traffic received on the second antenna and identifying the specified periodic bit sequence received from the UE unit and determining a second position parameter; and a coordinate estimator for processing the two position parameters and establishing the geographical coordinates of the UE unit.

Advantageously, the invention does not require to equip a mobile with GPS for automatic location identification, thus enabling low cost user equipment to readily locate itself. In addition, since adoption of the WiMax standard, the trend in the wireless networking is to adopt similar technologies in the next generations of wireless networks such as 3GPP LTE and UMB systems. As such, the invention can be also applied to 3GPP LTE and UMB systems.

Another advantage of the method and systems of the invention is that it allows implementation of E911 location based services within WiMax systems using WiMax equipment. The invention is a good complement to, or replacement for GPS in some environments, particularly indoor environments where supposedly 80% of WiMax and 911 services users are situated, particularly once small WiMax BT or access points and Femto BTSs will be installed.

BRIEF DESCRIPTION OF THE DRAWINGS

The invention is next described with reference to the following drawings, where like reference numerals designate corresponding parts throughout the several views.

DESCRIPTION OF THE EMBODIMENTS OF THE INVENTION

In this specification, the terms "mobile caller" or "caller" is used to designate a user who currently accesses the services offered by a wireless network/services provider. The term "user equipment (UE unit)", "mobile devices (MD)", or "mobile station (MS)", is used to designate wireless-enabled devices such as handsets, phones, notebooks, and other wireless equipment used by subscribers to connect to a wireless or wireline network for exchange of digital or analog formatted information.

The term "base station (BS)" or "base transceiver station (BTS)" refers to the equipment in a wireless access network (WAN) which facilitates wireless access of mobile devices to a wireless or/and wireline communication network. The term "access point (AP)" refers to an indoor access point, which enables connection of indoors UE units to a wireless or a wireline network. BTSs and APs operate in a similar way from the point of view of the present invention, so that the term "BTS" also includes "AP". This specification uses the term "serving BTS" for the base station that currently connects the UE unit to the access network. The term "neighbouring BTS" is used for the BTSs in immediate proximity of the UE unit; a UE unit is in the coverage area of these neighbouring BTSs. This term includes the serving BTS.

The recognized meaning of the terms "uplink" and "downlink" is used throughout this specification. Namely, "uplink" refers to the traffic direction from a UE to a BTS and "downlink" refers to the traffic from a BTS to one or more UEs. The term "incoming traffic", which is a relative term, refers to the traffic arriving at a certain network entity on an uplink or a downlink.

While the invention is particularly relevant to E911 systems, it can be equally applied for locating a UE unit for other types of existing or emerging location positioning systems and services. E911 service is referred to here since this service recently became a mandatory requirement for WiMax service providers and users, with the advent of 802.16e (mobile WiMax) adoption.

Also, the invention is not restricted to WiMax systems; it can be used with other current and emerging wireless technologies that mandate broadcast of predetermined (specific) periodic bit sequences in the downlink sub-frames and/or require transmission of specific periodic bit sequences in the uplink sub-frames, as discussed next. Examples of such wireless networks are 3GPP LTE and UMB systems.

Figure 1A:
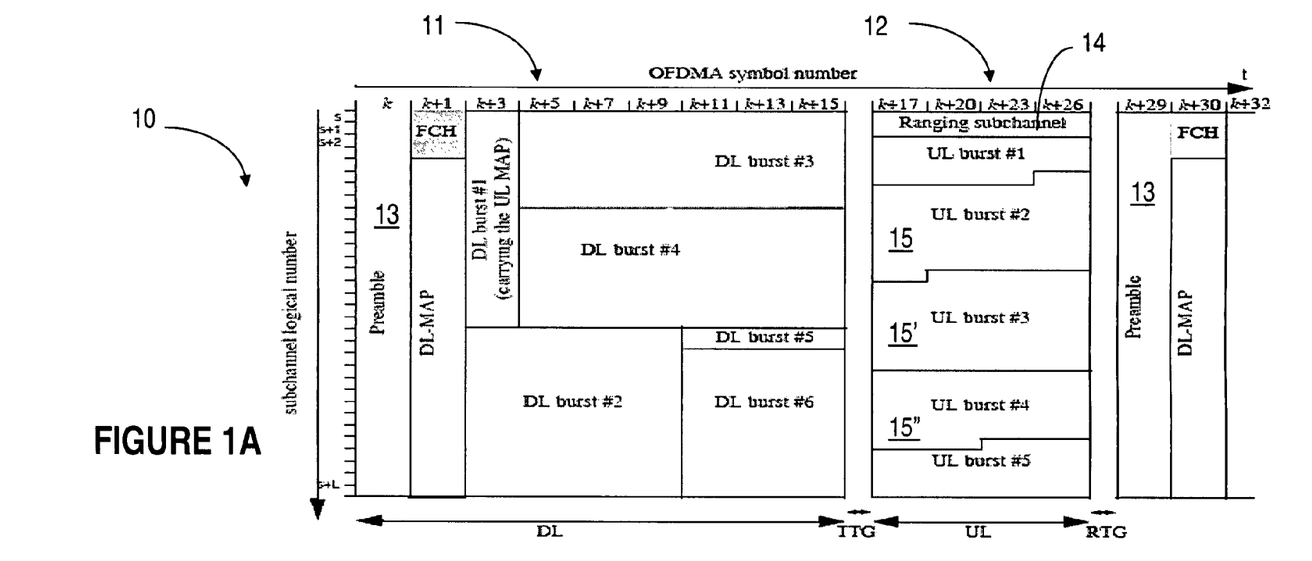
FIG. 1A shows an example of a frame for the mobile WiMax system.

FIG. 1A shows an example of a WiMax frame 10, illustrating the downlink (DL) subframe 11 and uplink (UL) subframe 12. In the direction from the BTS to the UE unit, shown by the downlink subframe 10, a BTS sends a preamble 13, which is used by the UE unit for cell/sector identification, frequency reuse factor, synchronization and channel performance assessment. The preamble has one of 128 distinct patterns; each sector in which a BTS transmits is identified in the preamble, using a cell ID. Thus, the neighbouring cells or sectors have different patterns so that the UE units are able to distinguish a cell or sector from others. An initial synchronization operation determines the start of the frame by observing the autocorrelation of the time domain replica of the preamble, with a view to detect the preamble. Preambles are usually sent with a boosted power (say, 2.5 dB higher than the data signal).

Figure 1B:
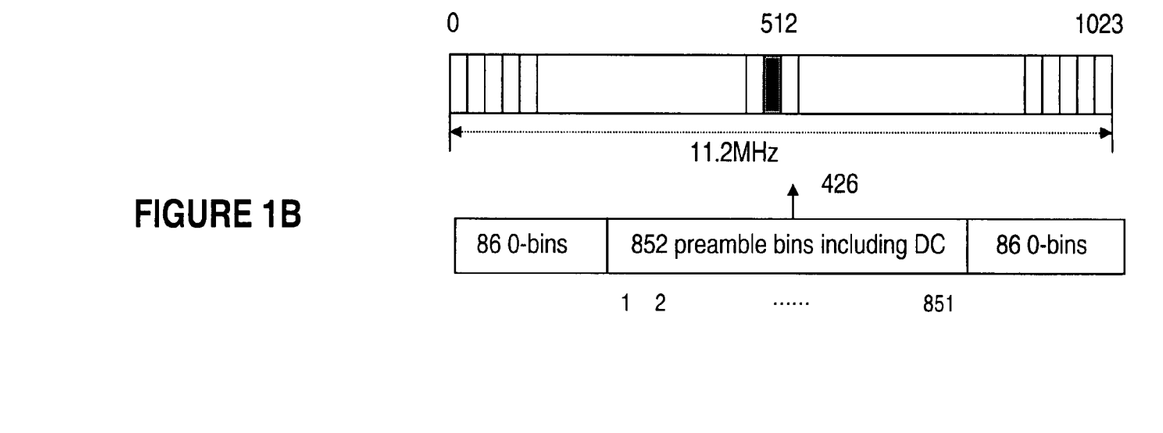
FIG. 1B illustrates an example of the preamble structure for OFDM modulation in 10 MHz band using 1024-FFT (Fast Fourier Transform).

FIG. 1B shows the subcarriers used by mobile WiMax systems for FFT-1024 variant. In this embodiment, the entire transmission band of 11.2 MHz has been divided into 1024 bins, among whin the middle 852 bins are used to carry the preamble (the DC bin carries "0").

These 852 bins are further divided into 3 sets for 3 sectors (as indicated above, a BTS within a sector transmits different preambles from the BTSs within the other two sectors) by applying the following formula:

$$\text{PreambleCarrierSet}n = n + 3k \qquad \text{EQ1}$$

where: PreambleCarrierSetn is the carrier/bin number in carrier-setn, n is the number of the preamble carrier-set indexed as 0, 1, 2, . . . ; and k is a running index from 0 to 283.

More precisely, the 852 carriers/bin are divided into 3 sets as follows:

Carrier-set 0: 0, 3, 6, 9, . . . , 849
Carrier-set 1: 1, 4, 7, 10, . . . , 850
Carrier-set 2: 2, 5, 8, 11, . . . , 851

As seen, each set has 284 carriers and the actual DC carrier number 512 maps to preamble carrier 426 belonging to carrier-set 0. Each preamble code is predesigned and assigned to a sector when the respective system (BTS) is deployed. The preamble of a downlink frame is generically referred to here as a downlink "specified periodic bit sequence", where the word "specified" is used to indicate that the bit sequence is known to the receiver, and the word "periodic" is used to indicate that the bit sequence is transmitted periodically in the downlink (with each downlink frame).

Figures 2A, 2B, 3:
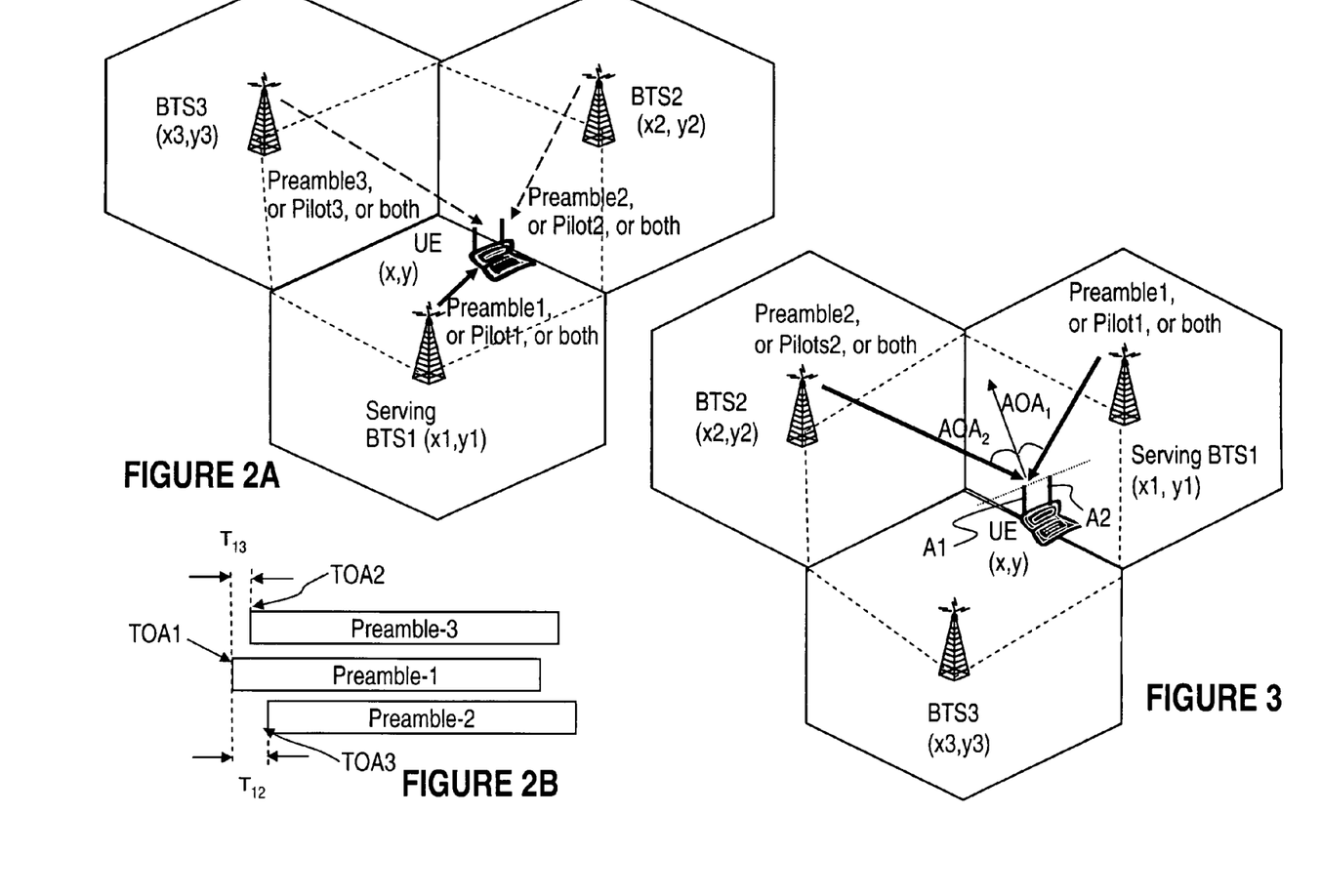
FIGS. 2A and 2B show an embodiment of the invention whereby a user equipment (UE) unit determines its location using the preamble or the pilot tones inherently present in the WiMax downlink frames.
FIG. 3 shows another embodiment of the invention where a UE unit determines its location using the angle of arrival of the preambles or pilot tones inherently present in WiMax systems.

FIGS. 2A, 2B and 3 show various automatic location identification (ALI) methods where the UE identifies the coordinates of its location and transmits these with the call to a PSAP (Public Safety Answering Point) or the like. FIGS. 2A and 2B show an embodiment of the invention where the UE unit determines its coordinates using the preamble received in the WiMax downlink subframes. Here, an UE unit places a "911" call, or the like, to its serving BTS from a location UE(x,y), where x and y are the coordinates (unknown) of the US unit. The UE unit is in proximity of at least three BTSs, namely the serving BTS, designated with BTS1, and two neighbouring BTSs designated with BTS2 and BTS3. The coordinates of these BTSs are known, in many cases they are ascertained using GPS equipment customary embedded in the BTSs. The position of each BTS is denoted with BTS1(x1, y1) BTS2(x2,y2) and BTS3(x3,y3), where x1,y1, x2,y2 and x3,y3 are the respective coordinates.

As indicated above, each BTS transmits periodically a certain bit sequence in the downlink frame. In this embodiment, this known periodic bit sequence is the downlink preamble for the respective sector: these are denoted with Preamble1, Preamble2 and respectively Preamble3. The UE unit monitors constantly the incoming traffic to identify the preambles. Since the distances to BS1, BS2 and BS3 are different, the UE unit receives the preamble from the three BTs at different times; let's denote these times of arrival with TOA1, TOA2 and TOA3.

The UE unit aligns the times of arrival of the preambles Preamble2 and Preamble3 received form BTS2 and BTS3 to the time of arrival of the Preamble1 received from the serving BTS1. In FIG. 2B, the time difference between the arrival of the Preamble1 and Preamble2 is denoted with T12, and the time differences between the arrival of the Preamble1 and Preamble3 is denoted with T13. These time differences are referred to generically as "position parameters" and they include inherently the relative position of the UE unit with respect to the BTSs. As the geographical position of the UE unit is fully determined by two unknowns (UE coordinates x and y), two such position parameters will suffice to determine the coordinates x, y.

In order to determine T12 and T13, UE unit generates local copies of the Preamble2 and Preamble3, and correlates the data blocks from these copies with the data block from Preamble1 received from the serving BTS. The correlation can be performed either in the time domain or in the frequency domain. Then, the UE unit solves the following equations of two unknowns (x and y) to obtain its position UE(x,y)

$$\sqrt{(x-x2)^2 + (y-y2)^2} - \sqrt{(x-x1)^2 + (y-y1)^2} = T12v$$
$$\sqrt{(x-x3)^2 + (y-y3)^2} - \sqrt{(x-x1)^2 + (y-y1)^2} = T13v$$
EQ2 where v is the speed of light (3×108 m/s).

Once the geographical coordinates (x, y) of the UE unit are determined, the location data is transmitted to the PSAP or other relevant services according to the acknowledged scope of location identification. For example, a 911 call is routed in North America to the emergency services dispatch. The PSAP further process this information to establish practical details about the location of the caller, using for example maps of the respective area, or street addresses, etc.

Similarly to the preamble, the BTS also transmits pilot signals in the downlink frames on reference carriers. Different sub-channelization schemes have different pilot designs in terms of pilot position in the transmission band and their number, and the data they carry. The pilots in each sector are associated with a pseudo-random bit sequence that is established based on the cell ID. As each pilot in a sector carries the same predetermined reference symbol, a UE unit can recognize that sector's pilots by identifying the cell ID from the respective preamble. Like the preambles, the pilots are also transmitted with a boosted power (2.5 dB higher than data signal).

Since the magnitude and phase of the pilot carriers are known to the receiver, they are used in WiMax systems for time and frequency synchronization, channel estimation, signal-to-interference/noise ratio measurement, etc. For the 10 MHz, FFT-1024 variant of the mobile WiMax, there are 120 pilots inserted every OFDM symbol. These properties of the pilots are used in this invention for determining the geographical coordinates of a mobile device, as discussed above in connection with FIGS. 2A and 2B for the preamble.

The present invention also proposes to use the WiMax downlink pilots for measuring the position parameters T12 and T13; the pilots are also generically referred to as a downlink "specified periodic bit sequence". In this case, T12 and T13 provide the time differences between the time of arrival of the pilots received from the neighboring base stations BTS2, BTS3 and the time of arrival of the pilot received from the serving base station BTS1.

It is to be noted that the invention is not limited to establishing the UE unit coordinates using one of the preamble and pilots embodiments described above. Rather, the UE unit may use both the preamble and the pilot methods. In addition, a UE unit may use any other bit sequence of a known pattern that is transmitted periodically in the downlink frame of other wireless communication technologies (current or emerging) for determining its position.

As also indicated above, the mobile WiMax Standard mandates that the mobile be equipped with minimum two antennae separated by a distance of a half wavelength. In the embodiment of FIG. 3, the UE unit determines its location using the downlink specified periodic bit sequence (the preamble, the pilots, or both) inherently broadcast by the BTSs in WiMax systems (and may be other emerging wireless systems). As in the previous example, the UE unit continuously monitors the downlink transmissions received from neighbouring base stations. Each antenna A1, A2 receives the signals from the BTS1, BTS2 and BTS3 at a different angle of arrival (AOA). The UE unit selects the strongest two signals it receives at these two antennae; let's assume that these are the pilot or preamble received from the serving station BTS1 located at BTS1(x1,y1) and from base station BTS2, located at BTS2(x2,y2). The UE unit then estimates the angles of arrival AOA1 and AOA2 of these two signals, and determines coordinates x and y by solving a linear equations of two unknowns:

$$\frac{y1-y}{x1-x} = \tan(\frac{\pi}{2} - AOA1)$$
$$\frac{y2-y}{x2-x} = \tan(\frac{\pi}{2} - AOA2)$$
EQ3

As before, the coordinates are used to establish the detailed location information using maps or any other type of known location data. For example, if the UE unit is equipped with a GPS, the particulars of location (x, y) may be detailed by the UE unit and transmitted automatically to the 911 operator (or any other relevant party). Such details may include a street address, including direction for the rescue team, or details about the indoor location of a caller, such as the building, floor, etc. The information may also include explanations as to the geographical coordinates if the caller is not in an inhabited area, or directions to any relevant landmarks for assisting the rescuers to locate the position fast. It is to be noted that this embodiment is recommendable for determining the location of indoor callers.

Figure 4:
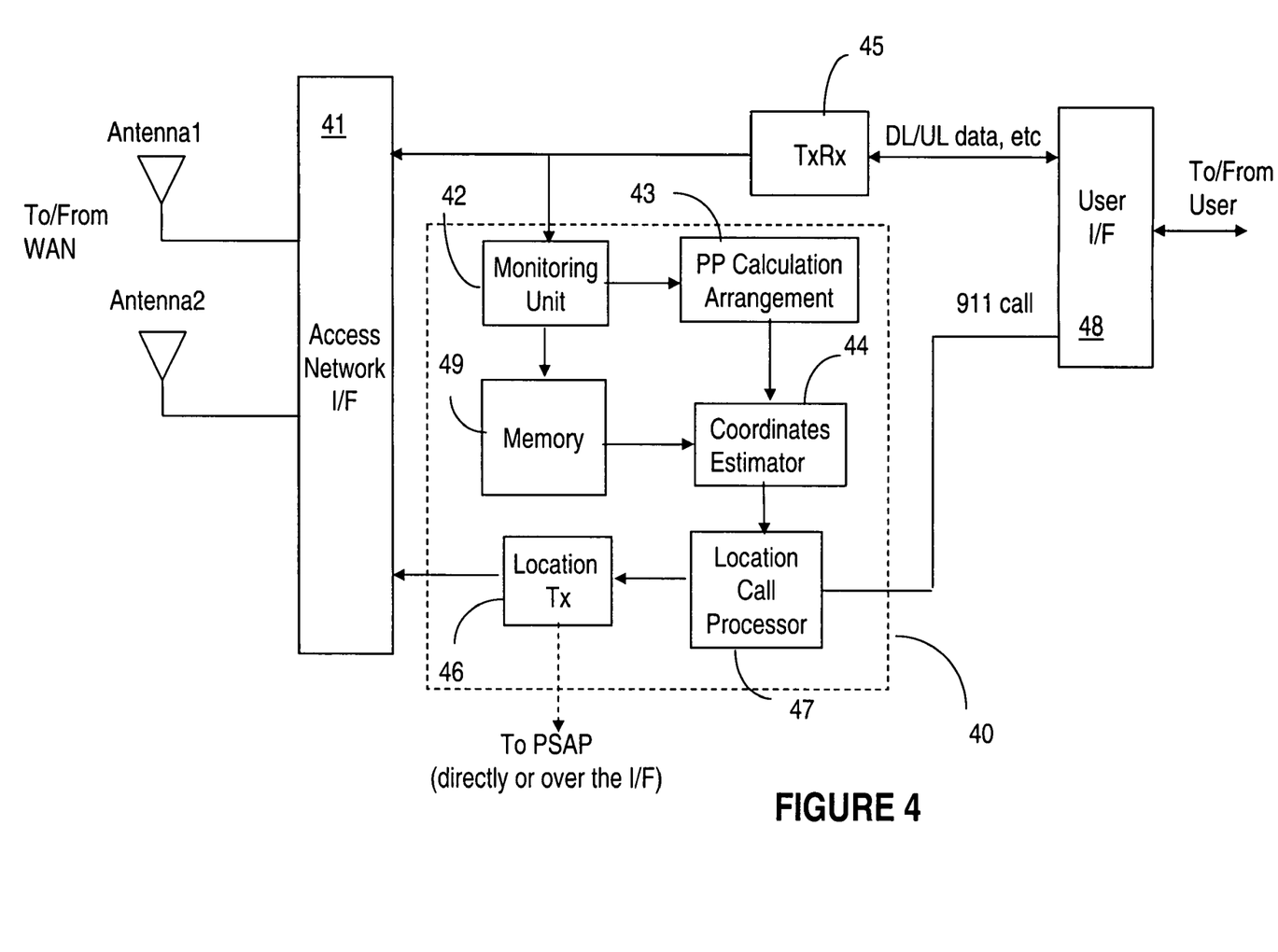
FIG. 4 is a block diagram of a user equipment unit according to an embodiment of the invention.

FIG. 4 shows a block diagram of the UE unit showing generically an access network interface 41 that connects the UE unit to the wireless access network, a transceiver 45 for data communication and processing and a user interface 48 that enables the user to operate the UE unit. In very broad terms, for the downlink direction of traffic (BTS to UE), interface 41 is responsible with processing the downlink frames received from the BTSs over Antenna1 and/or Antenna2. The receive side of transceiver 45 extracts the data from the downlink subframe and processes it, and the transmitter side of transceiver 45 provides the processed data to the user over user interface 48.

FIG. 4 shows a location identification module 40 which includes the units relevant to an embodiment of this invention. A monitoring unit 42 monitors the incoming traffic, detects the specified periodic bit sequence (preamble or pilot) and identifies the BTS that transmitted it. A position parameters calculation arrangement 43 determines from the bit sequence received from the BTSs two position parameters that inherently convey the relative position of the UE unit with respect to two or more BTSs. For example, and as discussed above, the position parameters may be T12 and T13 for the embodiment shown in FIG. 2A or/and the angle of arrival AOA1 and AOA2 for the embodiment of FIG. 3. The position parameters are then provided to a coordinates estimator 44.

For the TOA embodiment (FIG. 2A), copies of the respective bit sequences are temporarily stored in a memory 49, for enabling the coordinate estimator unit 44 to correlate the copies of the sequences with the sequence received from the serving BTS for determining T12 and T13; coordinates estimator 44 then determines the coordinates of the UE unit, based on the time differences T12 and T13 using EQ2. Alternatively, if the monitoring unit provides the angle of arrival, coordinate estimator 44 determines the coordinates of the UE unit using EQ3.

FIG. 4 also shows a stand-alone memory 49 which is a general purpose memory for enabling operation of the coordinates estimator. For example, memory 49 may be used for temporarily storing the coordinates of the serving base station and of the neighbouring BTSs for enabling the UE unit to calculate the UE unit coordinates based on the known coordinates of the BTSs. The geographical position of the BTSs may also be stored temporarily in memory 49, if transmitted to the UE unit through messaging once the UE unit initiates the respective call. Alternatively, the memory 49 may keep a list of the BTSs present in the respective access network once it enters into the area served by that network. Other ways of obtaining the coordinates of the BTS are possible, but these are beyond the scope of the present invention. It is also to be mentioned that memory 49 may be implemented in any other memory already present at the UE unit.

A location call processor 47 is provided for identifying a 911 call or the like, associating the coordinates information received form the coordinate estimator 44 with the call, and transmitting the call with the coordinates information to the interested parties (e.g. the PSAP). As shown in FIG. 4, this information can be transmitted over the access network interface as a regular outgoing call, or may be transferred directly to the PSAP over a separate direct link. Any other suitable arrangement for transmitting the call with the coordinates information is possible. It is also to be noted that processor 47 may optionally add further details to the coordinates information if the UE unit is equipped for example with a GPS unit. Alternatively, detailed location information may be compiled at the PSAP; these details are beyond the scope of this invention.

Additional embodiments of the invention are network based methods where the coordinates of the UE unit are determined based on information inherently provided by the UE unit to the BTS in the uplink subframes. The uplink subframe 12 (see FIG. 1A) is made up of several uplink bursts 15, 15', 15" from different users. A portion of the uplink subframe is set aside for contention-based access used mainly for a ranging channel 14 which enables the BTS to perform closed-loop frequency, time, and power adjustments during network entry as well as periodically afterward. The fundamental mechanism of ranging involves the UE unit transmitting periodically a randomly selected code division multiple access (CDMA) code in a specified ranging channel, on a randomly selected ranging slot in a ranging opportunity defined by the network. Thus, a ranging code is transmitted by UE unit periodically after it connects to the network and during various stages of the connection. A number of codes are allocated to each ranging mode, such as for example an initial ranging, a handover ranging, a periodic ranging, a bandwidth request ranging (these ranging modes are so far defined in WiMax Standard). A BTS keeps track of each UE unit's ranging signal in each ranging mode and then instructs the UE to adjust its transmission parameters such as timing (advance or retard), power level, frequency offset, etc or instructs the UE to respond in a mandate manner (for example, continuously repeat transmitting a BTS known signal in an allocated radio resource).

The present invention takes advantage of the ranging signals inherent to WiMax systems, or any other systems that use a specified periodic bit sequence (such as periodic ranging, bandwidth request ranging). Furthermore, according to the invention, a new "location ranging" signal may be allocated for location identification purposes. This new location ranging signal may be triggered by pushing a special purpose button on the UE unit (e.g. a E911 button). To summarize, the ranging signals are referred generically as an uplink "predetermined periodic bit sequence", and are very important resources for locating and tracking a UE unit within a wireless network.

Figures 5, 6:
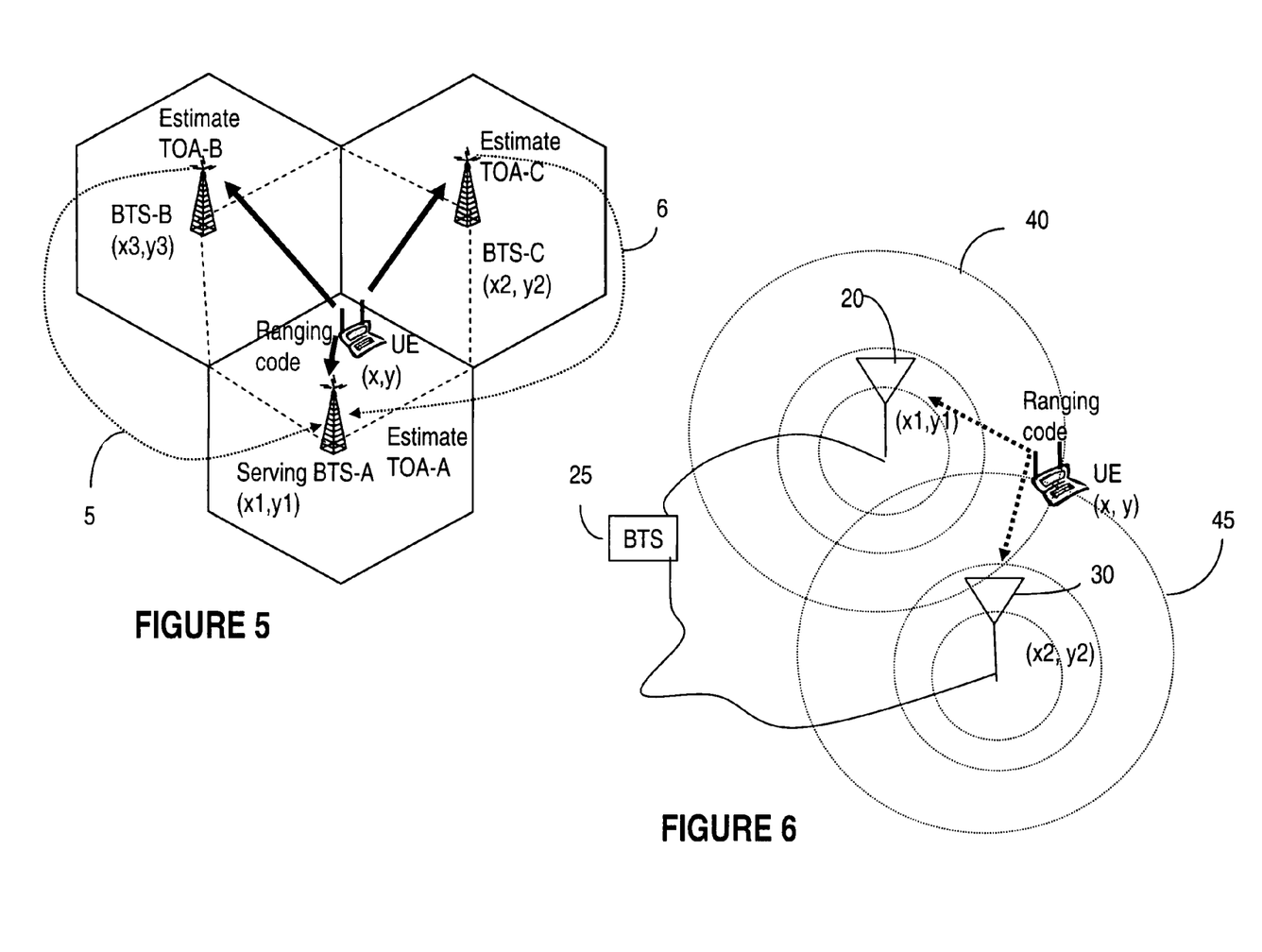
FIG. 5 illustrates still another embodiment of the invention where location of the UE is determined by cooperation between base stations using the two antennae inherently present in the UE unit.
FIG. 6 shows an embodiment of the invention where a base station determines the location of a UE unit using the ranging codes transmitted by the UE.

As seen in the embodiment of FIG. 5, three neighbouring base transceiver stations BTS-A (the serving BTS), BTS-B and BTS-C receive the ranging code from the mobile UE unit and perform triangulation using this signal. As the BTSs are all GPS synchronized, a BTS can estimate the distance to the UE unit (but not the coordinates) by comparing the time of arrival of the ranging code provided by its clock, with the time when the UE unit transmitted the ranging code. This is possible since a BTS always tracks the ranging codes.

Similar notations as before are used for the location of the base stations and the UE unit, namely BTS-A(x1,y1), BTS-B(x2,y2), BTS-C(x3,y3), and UE(x,y). Each BTS estimates the time of arrival TOA of the ranging code: BTS-A determines TOA-A, BTS-B determines TOA-B and BTS-C determines TOA-C. Base stations BTS-C and BTS-B transmit the estimates to the serving BTS-A, as shown by dotted arrows 5 and 6, and BTS-A performs the triangulation also knowing the time when the ranging code has been transmitted by the UE unit. BTS-A establishes the coordinates (x,y) of the UE unit as a result of the triangulation.

Still another embodiment of the invention is shown in FIG. 6. In this embodiment, the BTS 25 has a distributed antenna system; two receive antennae are denoted with 20 and 30 on FIG. 6. The coordinates (x1,y1) and (x2, y2) of these antennae are known and the distance between the antennae is large relative to the wavelength, but is relative small compared to the distance between the UE unit and the BTS. The BTS establishes the equations expressing the circles 40 and 45 by estimating the TOA of the same ranging code (to the antennae 20 and 30 (the ranging code is identified based on the time of transmission which is known to the BTS). Then, the BTS calculates the intersection between two of the circles, which provides the coordinates (x, y) of the UE unit, as shown by EQ4:

$$(x-x_1)^2+(y-y_1)^2=r_1^2$$

$$(x-x2)^2+(y-y_2)^2=r_2^2 \qquad \text{EQ4}$$

Solving equations EQ4 will give two solutions; the location in front of the antennae is selected as the result.

Figures 7, 9:
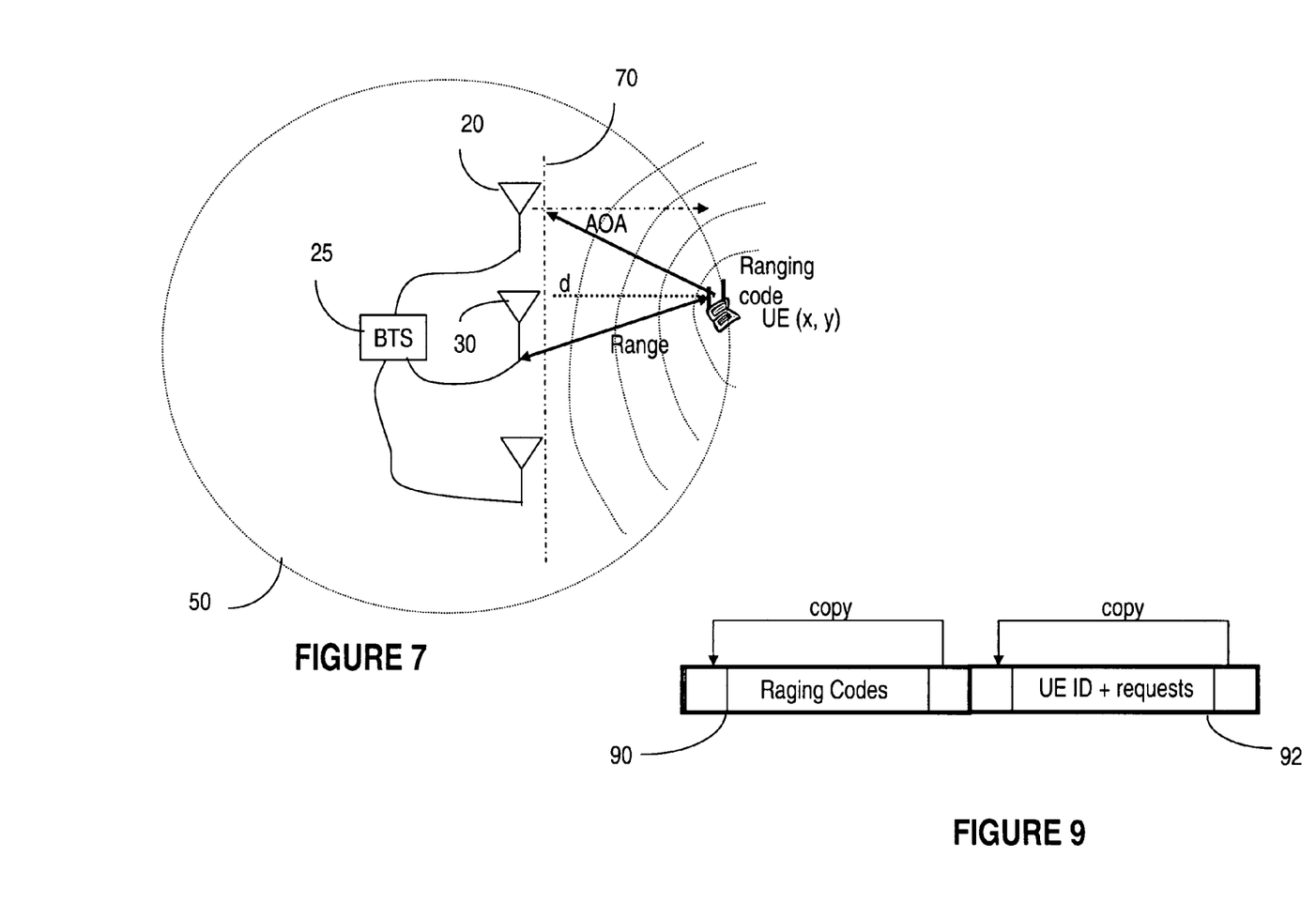
FIG. 7 illustrates how a base station with multiple antennae identifies the location of a UE unit according to still another embodiment of the invention.
FIG. 9 illustrates use of an additional symbol in the upstream subframe for transmitting location requests and UE unit identification information to the BTS.

FIG. 7 shows yet another embodiment of the invention that takes advantage of the multiple antennae systems present at a WiMax BTS. In this variant, the BTS 25 estimates the angle of arrival AOA of the ranging code at antenna 20 and estimates the distance to the mobile (range) to antenna 30. As indicated above, it is known to determine the distance between the UE and the BTS; however, this location parameter only enables to establish a circle 50 on which the UE may be located. By additionally determining a second location parameter (AOA in this example), BTS 25 can determine the distance 'd' to the plane 70 of the antennae, and then the geographical coordinates (x,y) of the UE unit. This determination is based on the geographical coordinates of the BTS and antennae, which are know.

Once the BTS determines the coordinates of the UE unit, the information may be automatically appended to the "911" call so that the operator may determine the exact position of the caller using maps or any other type of known detailed location information, as discussed above.

Figure 8:
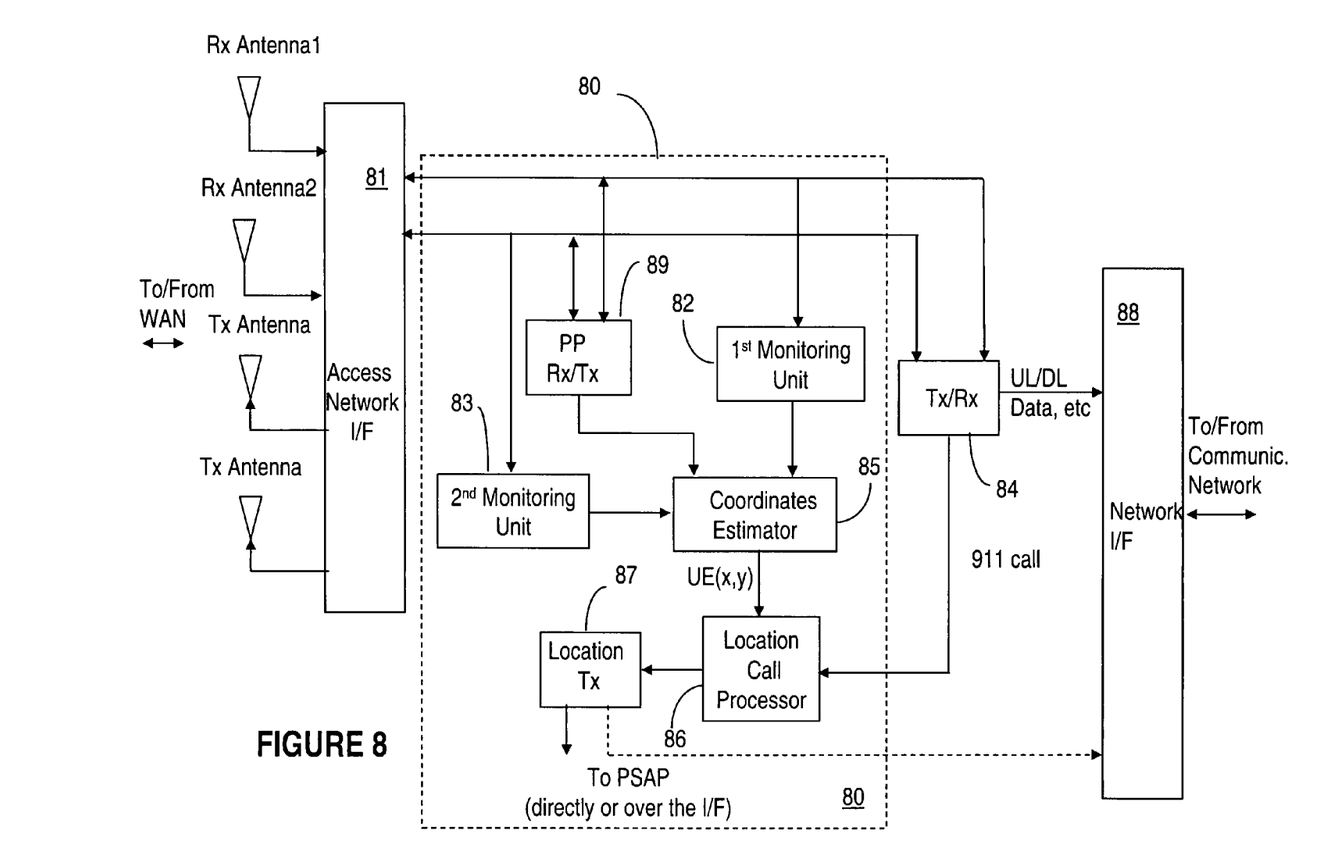
FIG. 8 is a block diagram of the base station according to an embodiment of the invention.

FIG. 8 is a block diagram of the user equipment according to an embodiment of the invention. This figure illustrates the units relevant to locating the UE unit based on processing the ranging codes (the predetermined periodic bit sequence) received in the uplink subframes.

As in the case of FIG. 4, FIG. 8 illustrates generically the units of the base transceiver station, namely an interface 81 with the wireless access network over which the BTS communicates with the UE units, and an interface 88 between the BTS and a wireless or wireline communication network. A transceiver 84 shows generically the expected functionality of the BTS such as, for example for the uplink direction, extracting data from the frames received from the access network, processing the data, re-formatting and transmitting it over the communication network towards destination. Of course, the BTS enables other communication scenarios, but these are beyond the scope of this invention. FIG. 8 also shows two receive antennae denoted with Antenna1 and Antenna2 on the wireless access network (WAN) side.

In the embodiment of the invention shown in FIG. 8, the BTS includes a location identifier module 80 including a first monitoring unit 82 and a second monitoring unit 83. The monitoring units identify the specified periodic bit sequence (here the ranging code from the uplink subframe) in the incoming traffic received by the Antenna1 and Antenna2, respectively. For example, for the embodiment of FIG. 6, the position parameters determined by the monitoring units are the time of arrival TOA1 of the ranging code on Antenna1 and the time of arrival TOA2 of the ranging code on Antenna2. Alternatively, the position parameters are, in the example of FIG. 7, the angle of arrival of the ranging code on Antenna1 and the distance of the UE unit from Antenna2.

For the embodiment of FIG. 5, monitoring unit 82 detects the TOA of the ranging code received at the BTS from the UE unit, and monitoring unit 83 identifies the TOA measured by two other BTSs and transmitted to the BTS in a downlink frame (as shown by arrows 5 and 6 on FIG. 5). It is to be understood that the BTS may be equipped with one monitoring unit that performs both measurements; this is a matter of design preference.

In the embodiment of FIG. 5, a position parameters transceiver unit 89 is used to receive and recognize any position parameter transmitted by the neighbouring BTSs, and to transmit the position parameter measured by the BTS to the neighbours. Alternatively, the position parameters may be received and transmitted at a BTS from the neighbours on demand from the BTS that serves the UE unit for which the location is to be determined.

The location identifier module 80 also comprises a coordinates estimator 85 which determines the coordinates of the UE unit based on the measurements received from the monitors or transceiver 89. For example, if the coordinates are determined based on the TOA estimates, as in the embodiment of FIG. 5, the coordinates estimator 85 may perform a triangulation to obtain (x,y). If the position parameters are the ranges as in the embodiment of FIG. 6 or a range and an angle of arrival, as in FIG. 7, the coordinates estimator makes the appropriate calculations as described above.

Once the geographical coordinates of the UE unit are determined, the BTS inserts these in the outgoing 911 call (or the like), as shown by the location call processor 86, and the call with the location information is then switched to the destination, shown by location transmitter 87, where the emergency services or PSAP operators processes the call accordingly.

As indicated above, in one embodiment of the invention, the UE unit is enabled to transmit to the BTS a certain signal, called here a "location ranging" code/signal that is recognized by the BTS as related to location determination. This is shown in FIG. 9, where the uplink subframe provides for a first ranging code 90 and a location ranging code 92. The location ranging code may for example include an identification of the UE unit and a request for geographical location; this signal is known to the BTSs. Transmission of the location ranging code may be initiated by the user or may be automatically triggered at preset intervals. For example, in a location ranging mode, the UE unit may use two OFDM symbols where the first OFDM symbol contains a location ranging code of 144 bits each, while the second OFDM symbol contains the callers ID and/or requests up to 144 bits.

We claim:

1. A method of operating a user equipment (UE) unit for determining the location of the UE, the UE operating within the coverage area of two or more base transceiver stations (BTS) that each transmit a respective specified periodic bit sequence over a radio access network, comprising:

at said UE unit,
obtaining geographical coordinates of a serving BTS and at least a first and a second BTS;
monitoring incoming traffic received from the serving BTS and the first and the second BTSs for detecting respective specified periodic bit sequences from the serving BTS and the first and second BTSs, wherein the first and second BTSs are selected based on the strength of said specified periodic bit sequences at said UE;
determining from said specified periodic bit sequences received from the serving BTS and the first and second BTSs a first set of position parameters using a first technique that convey the relative position of said UE unit to two or more of said BTSs;

determining from said specified periodic bit sequences received from the serving BTS and the first and second BTSs a second set of position parameters using a second technique that convey the relative angular position of said UE unit with respect to two or more of said BTSs; and processing said first set of position parameters and said second set of position parameters for establishing the geographical coordinates of said UE unit.

2. A method as claimed in claim 1, wherein determining the first set of position parameters comprises:

establishing a first time of arrival (TOA1), a second time of arrival (TOA2) and third time of arrival (TOA3) of said specified periodic bit sequence from the serving BTS, and the first and second BTSs, respectively;

determining a first position parameter as a first time difference (T12) between the first and the second time of arrival; and determining a second position parameter as a second time difference (T13) between the first and the third time of arrival.

3. A method as claimed in claim 1, wherein determining the second set of position parameters comprises:

determining a first position parameter as a first angle of arrival (AOA1) of said specified periodic bit sequence from a first BTS on a first antenna of said UE unit; and determining a second position parameter as a second angle of arrival (AOA1) of said specified periodic bit sequence from a second BTS on a second antenna of said UE unit.

4. A method as claimed in claim 3, further comprising:

obtaining at said UE unit geographical coordinates of said BTSs; and establishing the geographical coordinates of said UE unit based on said first and second angles of arrival and the geographical coordinates of said BTSs.

5. A method as claimed in claim 3, wherein said one of the first and second BTSs is selected based on the strength of their periodic bit sequence at said second antenna.

6. A method as claimed in claim 1, wherein said radio access network is a one of a WiMax, a 3GPP LTE and a UMB network.

7. A method as claimed in claim 1, wherein said specified periodic bit sequence used for said first technique is a preamble transmitted in the downlink subframes by each said BTS and said specified periodic bit sequence used for the second technique is a pilot tone transmitted in the downlink subframes by each said BTS.

8. A method as claimed in claim 1, wherein said specified periodic bit sequence is a pilot tone transmitted in the downlink subframes by each said BTS.

9. A method as claimed in claim 1, further comprising:

appending said geographical coordinates to an emergency call generated on said UE unit; and routing said call from said UE unit to a public safety answering point.

10. A location identification module for a user equipment (UE) unit equipped with a first and a second antenna, comprising:

a monitoring unit for monitoring the incoming traffic received from a serving base transceiver station (BTS) and a first and a second BTS and identifying a respective specified periodic bit sequence received from each of the BTSs wherein the first and second BTSs are selected based on the strength of said periodic bit sequence at said UE;

a position parameters calculation arrangement for determining from said specified periodic bit sequences received from the serving BTS and the first and second BTSs, a first set of position parameters using a first technique that convey the relative position of said UE unit to the BTSs and determining from said specified periodic bit sequences received from the serving BTS and the first and second BTSs a second set of position parameters using a second technique that convey the relative angular position of said UE unit to two or more of said BTS;

a memory for storing the geographical coordinates of said BTSs; and a coordinate estimator for processing said first and second sets of position parameters and establishing the geographical coordinates of said UE unit.

11. A location identification module as claimed in claim 10, wherein said position parameters calculation arrangement includes:

means for establishing a first, second and third time of arrival (TOA1, TOA2, TOA3) of said specified periodic bit sequence from the serving BTS, and the first and the second BTS; and means for determining the first set of position parameters including a first position parameter as a first time difference (T12) between the first and the second time of arrival and a second position parameter as a second time difference (T13) between the first and the third time of arrival.

12. A location identification module as claimed in claim 11, wherein said coordinate estimator comprises:

means for establishing the coordinates of said UE unit based on said first and second time differences and the geographical coordinates of said BTSs.

13. A location identification module as claimed in claim 10, wherein said position parameters calculation arrangement is configured to determine the second set of position parameters including a first angle of arrival of said specified periodic bit sequence received from the serving BTS at said first antenna and a second angle of arrival of said specified periodic bit sequence received from one of the first and second BTSs at said second antenna.

14. A location identification module as claimed in claim 10, further comprising a location call processor for appending said geographical coordinates to an emergency call generated on said UE unit and routing said call from said UE unit to a public safety answering point.

15. A location identification module as claimed in claim 14, further comprising a GPS unit for providing additional detailed location information to said location call processor for insertion into said call.

* * * * *